United States Patent
Yaras (10) Patent No.: US 12,289,560 B2
(45) Date of Patent: Apr. 29, 2025

(54) FALSE-POSITIVE FILTER FOR SPEAKER TRACKING DURING VIDEO CONFERENCING

(71) Applicant: Hewlett-Packard Development Company, L.P., Spring, TX (US)

(72) Inventor: Fahri Yaras, Cedar Park, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 299 days.

(21) Appl. No.: 17/898,339

(22) Filed: Aug. 29, 2022

(65) Prior Publication Data
US 2024/0073367 A1    Feb. 29, 2024

(51) Int. Cl.
| | |
|---|---|
| H04N 7/15 | (2006.01) |
| G01J 5/48 | (2022.01) |
| G06T 3/40 | (2024.01) |
| G06T 7/20 | (2017.01) |
| G06T 7/62 | (2017.01) |
| G06V 10/25 | (2022.01) |
| G06V 10/44 | (2022.01) |
| G06V 10/74 | (2022.01) |
| G06V 40/16 | (2022.01) |
| G01J 5/00 | (2022.01) |

(52) U.S. Cl.
CPC ............... *H04N 7/152* (2013.01); *G01J 5/48* (2013.01); *G06T 3/40* (2013.01); *G06T 7/20* (2013.01); *G06T 7/62* (2017.01); *G06V 10/25* (2022.01); *G06V 10/443* (2022.01); *G06V 10/761* (2022.01); *G06V 40/161* (2022.01); *G01J 2005/0077* (2013.01); *G06T 2207/10048* (2013.01); *G06T 2207/20081* (2013.01)

(58) Field of Classification Search
CPC .. H04N 7/15; G01J 5/48; G01J 5/0025; G06T 3/40; G06T 7/20; G06T 7/62; G06V 10/25; G06V 10/44; G06V 10/74; G06V 40/16; G06V 10/26; G06V 20/40; G06V 10/143
See application file for complete search history.

(56) References Cited

U.S. PATENT DOCUMENTS

| | | | | |
|---|---|---|---|---|
| 7,840,036 B2 * | 11/2010 | Higaki | .................... | G06T 7/251 382/118 |
| 2018/0336687 A1 * | 11/2018 | Mudretsov | .............. | G06T 7/246 |

* cited by examiner

Primary Examiner — Yosef K Laekemariam
(74) Attorney, Agent, or Firm — Quarles & Brady LLP (57) ABSTRACT

A method including receiving, at a camera, light comprising a visible spectrum and an infrared spectrum (200). The method also includes detecting, using the visible spectrum, a candidate image of a head (202). The method also includes determining an estimated true size of the head (204). The method also includes determining, using the infrared spectrum, a temperature of the head (206). The method also includes filtering the candidate image of the head with respect to an operation of a video controller configured to track one or more images of heads in the visible spectrum. Filtering is based on both the estimated true size of the head and the temperature of the head (208).

7 Claims, 5 Drawing Sheets

FALSE-POSITIVE FILTER FOR SPEAKER TRACKING DURING VIDEO CONFERENCING

BACKGROUND

Video conferencing software permits people to communicate with each other while seeing each other's facial expressions and body language. Video conferencing systems can provide extra features that changes the view from the camera view. For example, some of features include focusing the view of a conference room that is shown to others to be just on the participants.

To provide the features, video conference systems use algorithms that identify people in the room. A challenge exists in automatically and accurately identifying the people.

SUMMARY

The one or more embodiments provide for a method. The method includes receiving, at a camera, light including a visible spectrum and an infrared spectrum (200). The method also includes detecting, using the visible spectrum, a candidate image of a head (202). The method also includes determining an estimated true size of the head (204). The method also includes determining, using the infrared spectrum, a temperature of the head (206). The method also includes filtering the candidate image of the head with respect to an operation of a video controller configured to track one or more images of heads in the visible spectrum. Filtering is based on both the estimated true size of the head and the temperature of the head (208).

The one or more embodiments also provide for a method of modifying a video stream. The method includes receiving, at a camera, light including a visible spectrum and an infrared spectrum (300). The method also includes generating, using the light, a video stream (302). The method also includes detecting, using the visible spectrum, a candidate image of a head in the video stream (304). The method also includes detecting, using the visible spectrum, a images of heads in the video stream, the images of heads including the candidate image of the head (306). The method also includes determining, from the candidate image of the head, an estimated true size of the head (308). The method also includes determining, using the infrared spectrum, a temperature of the head (310). The method also includes generating a modified head detection by removing, from the images of heads, the candidate image of the head, wherein removing is performed responsive to both i) the estimated true size of the head being less than a threshold size range, and ii) the temperature of the head being outside a threshold temperature range (312). The method also includes modifying the video stream using the modified head detection (314).

The one or more embodiments also provide for a system. The system includes an optical camera (102P) configured to receive a visible spectrum (148) of light, and generate a video stream (116) from the visible spectrum (148). The system also includes an infrared camera (102I) configured to receive an infrared spectrum (146) of light. The system also includes a machine learning model (108) configured to detect a images of heads (118) in the video stream (116). The images of heads (118) including a detection of a candidate image of a head (120). The system also includes a spectral controller (110) configured to estimate, using the infrared spectrum (146), a temperature (128) of the head. The system also includes a video controller (106) in communication with the optical camera (102P), the infrared camera (102I), the machine learning model (108), and the spectral controller (110). The video controller (106) is configured to select the candidate image of the head (120) from among the images of heads (118) in the video stream (116). The video controller is further configured to determine an estimated true size (124) of the head. The video controller is further configured to generate a modified head detection (132) by removing, from the images of heads (118), the candidate image of the head (120). Removing is performed responsive to both i) the estimated true size (124) of the head being less than a threshold size (126) range, and ii) the temperature (128) of the head being outside a threshold temperature range (130). The video controller is further configured to modify the video stream (116) using the modified head detection (132).

Other aspects of the one or more embodiments will be apparent from the following description and the appended claims.

BRIEF DESCRIPTION OF DRAWINGS

Like elements in the various figures are denoted by like reference numerals for consistency.

DETAILED DESCRIPTION

In general, the one or more embodiments relate to the processing of video streams during video conferencing so as to remove false detections of people in the video stream in order to improve the accuracy of video processing based on detected images of heads. For example, the one or more embodiments may be used to determining which heads detected in an image are misleading images of heads (e.g., reflections in a window of heads of people, a picture of a head of a person in a painting, etc.). The misleading images of heads are removed from further processing of the video stream.

In a specific example, a video conferencing system detects images of heads in a video stream, and then modifies the video stream accordingly. The technical issue in this example relates to false-positive head identifications. False-positive head identification occurs when the video conference system mistakes an object that is not a living person in a room with a living person. For example, the video conferencing system may mistake pictures of people hanging in a conference room as being the true images of heads of real participants. Likewise, reflections of people in windows, glass walls, or reflective table tops may cause such a video conferencing system to mistake such images as being the true images of heads of real participants. This type of mistake may be referred to as a "false-positive" or "false-positive identification," because the detected image of the head does not correspond to a living person, and therefore, cannot be a participant to the conference call.

A false-positive identification may cause the video conferencing system to frame not just the images of real people in the conference room, but also undesirably to frame the images of the misleading images of heads. Thus, false-positive identifications may be problematic in some video conferencing systems.

The one or more embodiments address the above-identified technical issue by reducing or eliminating false-positive identifications. More particularly, the one or more embodiments identify which images of heads do not correspond to real people, and then remove such false-positive images of heads with respect to further image processing or further video processing.

Still more particularly, the one or more embodiments estimate a true size of a head using the image of the head, estimate a temperature of the head, and then exclude from further processing a candidate image of a head when both i) the estimated true size of the head is outside a first size threshold or above a second size threshold, and ii) the temperature of the head is outside a temperature threshold range. Thus, the one or more embodiments may be used to reduce or eliminate false-positive images of heads with respect to further processing of the video stream.

Figure 1:
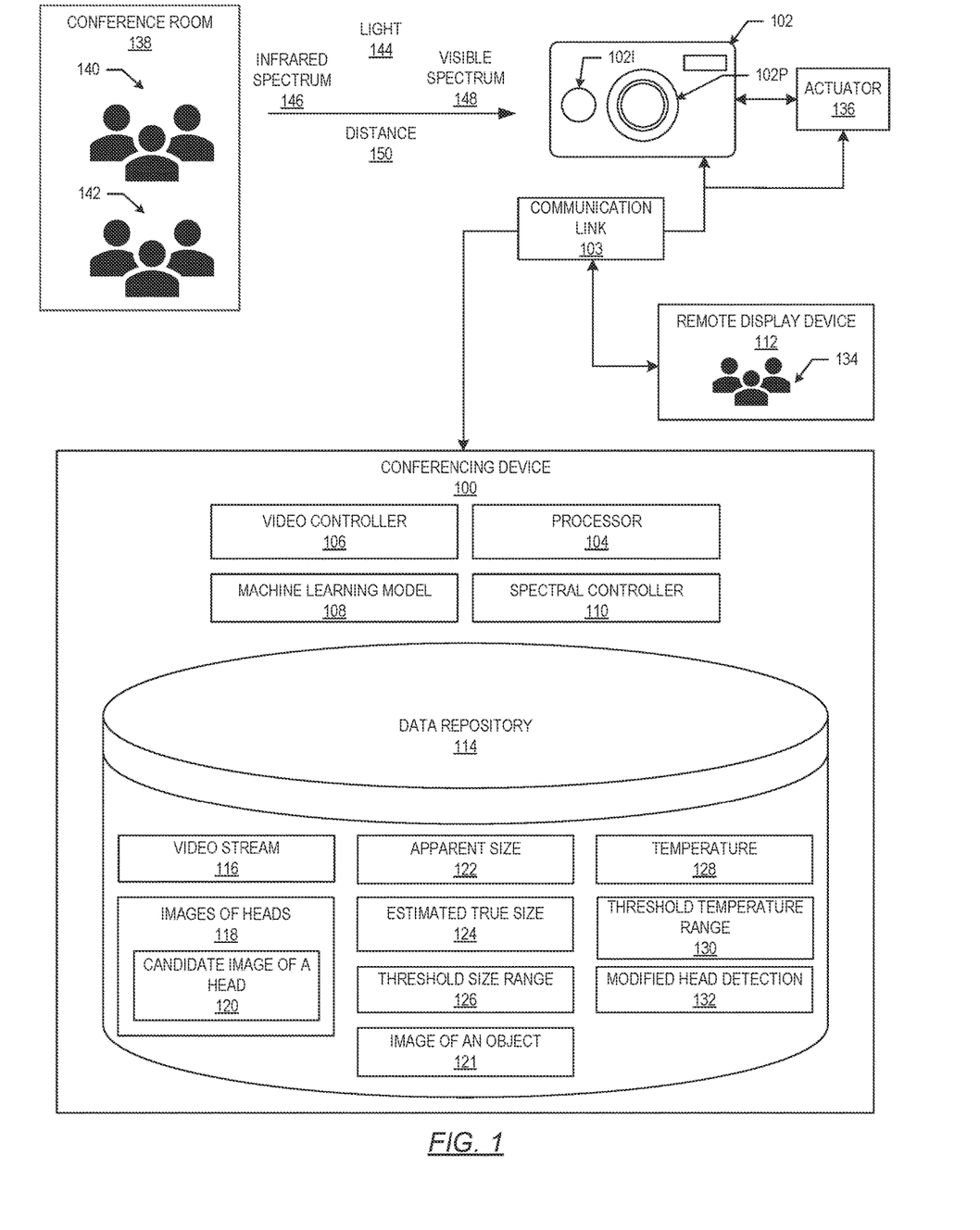
FIG. 1 shows a computing system, in accordance with one or more embodiments.

Attention is now turned to the figures. FIG. 1 shows a conferencing system, in accordance with one or more embodiments. The conferencing system includes at least a conferencing device (100). The conferencing device (100) is a computer (e.g., laptop, desktop, mobile phone, etc.), but may also be a device purpose-built for video conferencing.

The conferencing system may also include a camera (102). The camera (102) is a light detector configured to convert photons (i.e., light) into electrical signals which may be processed by hardware or software. The camera (102) is also configured to generate a video stream or one or more images using the light.

A brief description of the physical nature of light is provided here, in order to elucidate later how the temperature of a candidate image of a head (described below) may be estimated solely from light detected at the camera (102), as described with respect to FIG. 2. Light is composed of photons. A photon may be characterized as a packet of electromagnetic waves. Thus, light exhibits the properties of both a particle and a wave, depending on how the light interacts with the environment in which a photon is moving. Because light may be characterized as packets of waves, light has a wavelength (the distance between two successive crests or troughs of the electromagnetic wave within a given packet of waves). The shorter the wavelength, the more energy contained within the packet of electromagnetic waves. For example, X-rays have shorter wavelengths than visible light, so X-rays carry more energy than visible light. Likewise, visible light has shorter wavelengths than infrared light, so visible light carries more energy than infrared light.

Certain wavelengths of light may be characterized as either being in the infrared spectrum or visible spectrum. There may be some overlap in which wavelengths of light are characterized as "infrared" or "visible" light.

However, the one or more embodiments at least are concerned with detecting temperatures between a temperature that is at or near room temperature (e.g., about 72 degrees Fahrenheit) and the temperature of a human body (e.g., about 98 degrees Fahrenheit). As explained with respect to the method of FIG. 2, at 98 degrees Fahrenheit, all objects (including a human body) radiate light at electromagnetic wavelengths of about 8 micrometers to about 14 micrometers (and primarily at about 12 micrometers). A micrometer is one-millionth of one meter.

Thus, the infrared detector (102I) of the one or more embodiments is configured to detect infrared light at wavelengths between about 8 micrometers (or less) and about 14 micrometers (or more). Accordingly, as used herein, the term "infrared light" or "infrared spectrum" refers to light in the above-mentioned wavelength range, but may also refer to other wavelengths in the infrared spectrum. The process of estimating the temperatures of real objects from the detected infrared light is described with respect to FIG. 2.

Light at shorter wavelengths, but also visible to the human eye, is deemed to be "visible light." As used herein, "visible light" is light from about 380 nanometers (corresponding to violet light) to about 750 nanometers (corresponding to red light). A nanometer is one billionth of one meter.

As used herein, an "optical detector" is defined as a camera or other light detector configured to detect visible light. While the scientific field of "optics" includes the study of many spectral ranges of light (e.g., visible light, infrared light, and many other wavelength ranges of light), for simplicity of description with respect to the one or more embodiments, the term "optical detector" refers only to cameras that detect visible light.

Attention is now turned to the camera (102). The camera (102) may include multiple different detectors. For example, the camera (102) may include an optical detector (102P) and an infrared detector (102I). The optical detector (102P) is a light detector (e.g., a camera) configured to detect and process visible light. The infrared detector (102I) is configured to detect and process infrared light.

The camera (102) may form an image of an "object." An object is a real thing. The "image of the object" is a set of image pixels in a camera image that correspond to the object in the camera view. For example, a "chair" is a real chair. However, "an image of a chair" is a set of image pixels in a camera image that correspond to the real chair.

Similarly, a "head" is a real head of a real person. Accordingly, a "head" is a type of "object."

Likewise, an "image of a head" (defined further below) is a type of "image of an object." However, the one or more embodiments relate to automatic image processing by a computer. A computer, without the one or more embodiments, does not have the capability of distinguishing a true image of a head from a misleading image of a head. Therefore, as used herein, the term "image of a head" is a set of pixels in a camera image that correspond to an object which head detection software has determined to be a "head" (see the term "images of heads (118)," defined below). Accordingly, as used herein, the term "image of head" contemplates both misleading images of heads (defined further below) and true images of heads (defined further below).

The camera (102) may be part of the conferencing device (100), in some embodiments, but may be an external device connected to the conferencing device (100) via a communication link (103). The communication link (103), when present, is a wired connection or a wireless communication channel. The camera (102) and the conferencing device (100) may be at an initiation point of a video conference.

The conferencing device (100) includes a processor (104), a processor (104), a video controller (106), a machine learning model (108), a spectral controller (110), a remote display device (112), and a data repository (114). Each component is described in turn, though as explained below some components may be combined. Additionally, the conferencing device (100) may include other components in other embodiments, such as the camera (102).

Attention is first turned to the conferencing device (114) in order to define terms used with respect to the one or more embodiments. The data repository (114) is any type of storage unit or device (e.g., a file system, database, data structure, or any other storage mechanism) for storing data. Further, the data repository (114) may include multiple different, potentially heterogeneous, storage units or devices. In an embodiment, the data repository (114) is a non-transitory computer-readable storage medium.

The data repository (114) stores a video stream (116). The video stream (116) is computer-readable data derived from the camera (102). The computer-readable data may be used by the processor (104) to render the video stream (116) on the remote display device (112). The video stream (116) may be considered a series of images.

The data repository (114) also stores one or more images of heads (118). The images of heads (118) are the output or outputs of an algorithm that automatically determines that portions of images in the video stream (116) correspond to heads. In other words, an "image of a head" is a set of pixels in a camera image that correspond to an image of an object (121) which head detection software has determined to correspond to a head. An "image of a head" may be either a "true image of a head" (defined below) or a "misleading image of a head" (defined below). An "image of a head" is a type of "an image of an object."

The images of heads (118) may be generated (isolated) using a machine learning algorithm, such as but not limited to a facial recognition algorithm. The images of heads (118) may take the form of an identifier assigned to a portion of the image or video stream corresponding to the image of the head, a bounding box surrounding the portion of image or video stream corresponding to the image of the head, or some other indication that the algorithm has detected one or more images of head in the image or video stream.

The images of heads (118) include a candidate image of a head (120), or possibly more than one candidate image of a head. A "candidate image of a head" is an "image of a head" that is under consideration for being either a "true image of a head" or a "misleading image of a head."

A "true image of a head" is an "image of a head" that corresponds to a real "head." In other words, a "true image of a head" is a set of image pixels in a camera image that correspond to an object that is a "head" of a living person. Thus, a "true image of a head" reflects a true positive detection of a head by head detection software.

A "misleading image of a head" is an "image of a head" that corresponds to an object that is not a "head," but which head detection software incorrectly classifies as a real head of a living person. Thus, a "misleading image of a head" is a false-positive detection of a head by head detection software.

Figure 2:
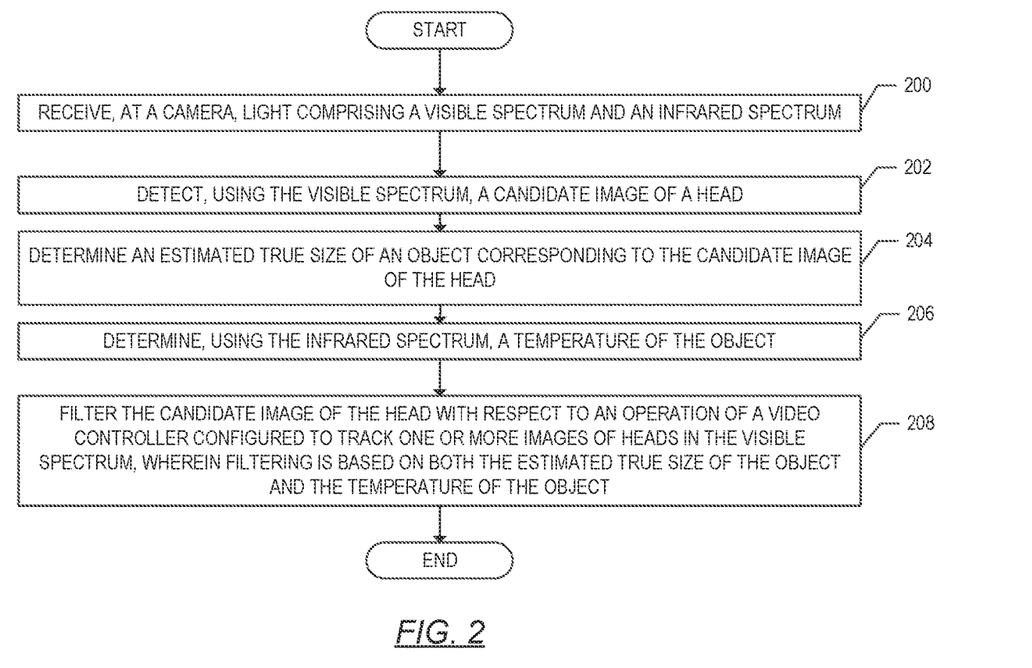
FIG. 2, FIG. 3, and FIG. 4 show flowcharts, in accordance with one or more embodiments.
Figure 3:
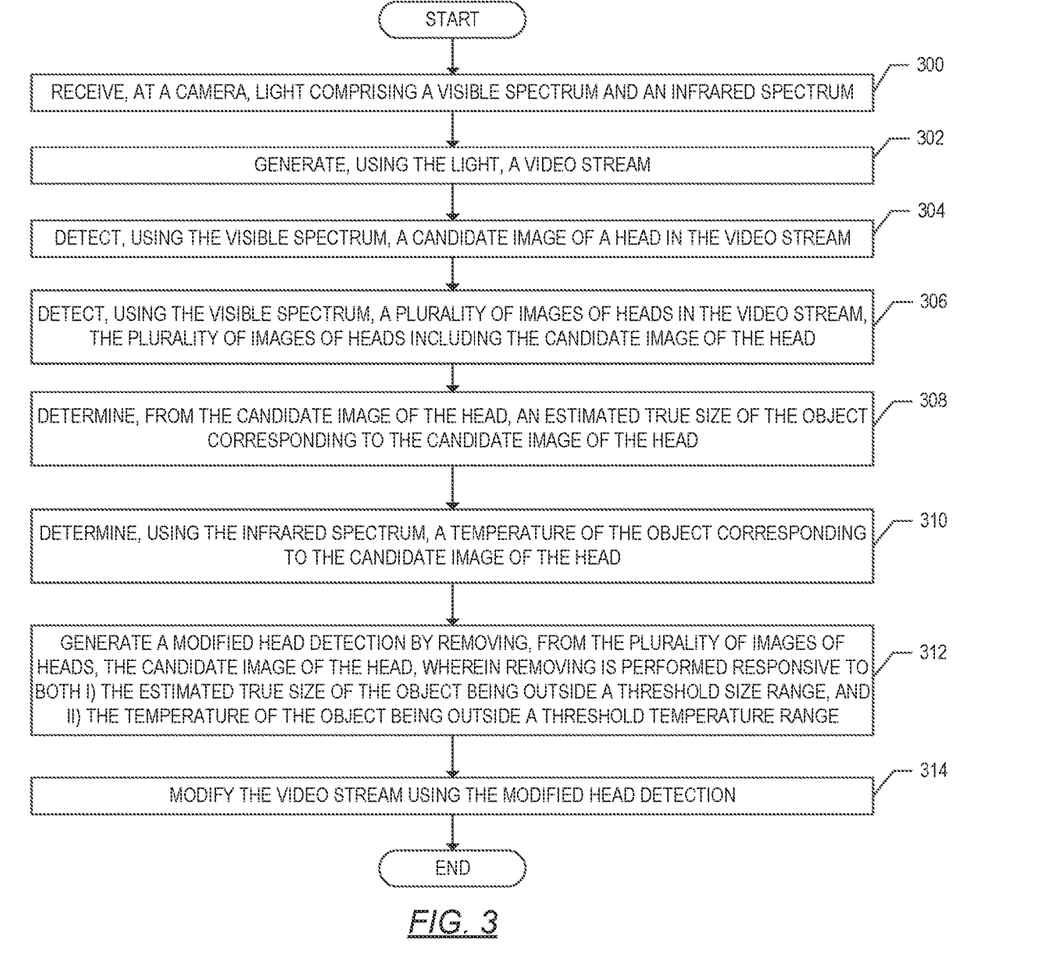
Figure 5:
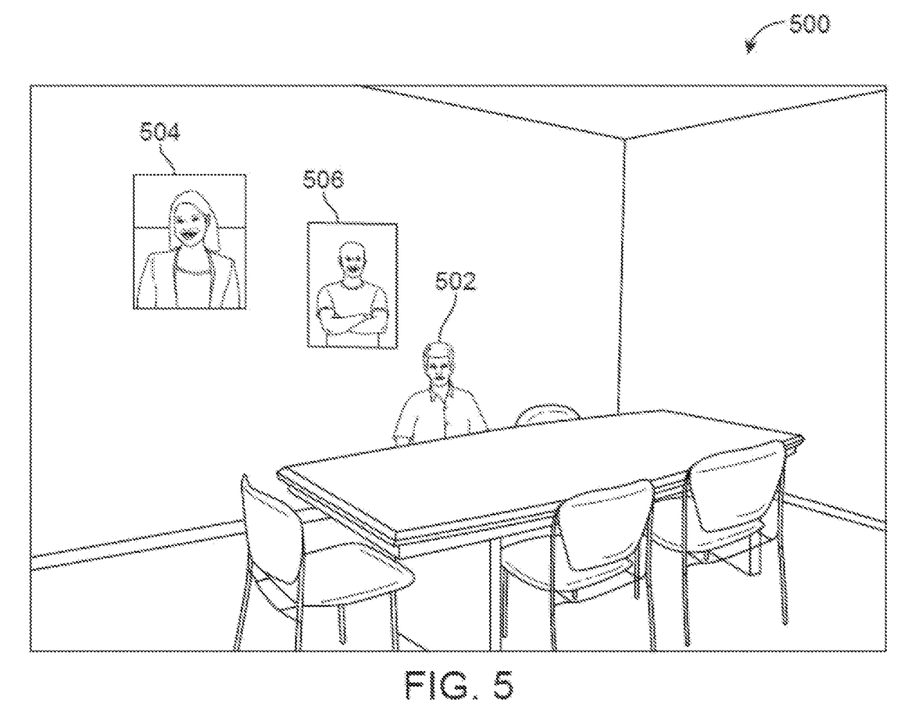
FIG. 5, FIG. 6, and FIG. 7 show an example of filtering images of heads from further processing of a video stream, in accordance with one or more embodiments.
Figure 6:
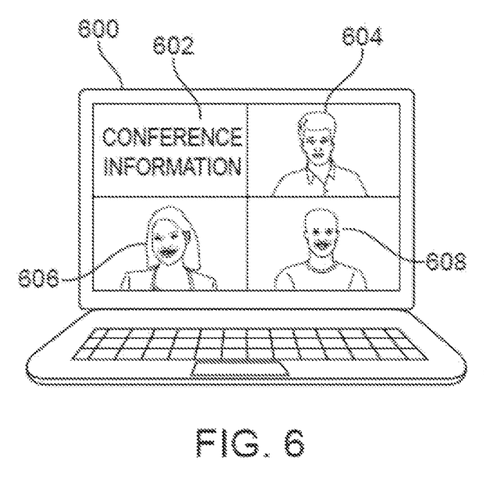
Figure 7:
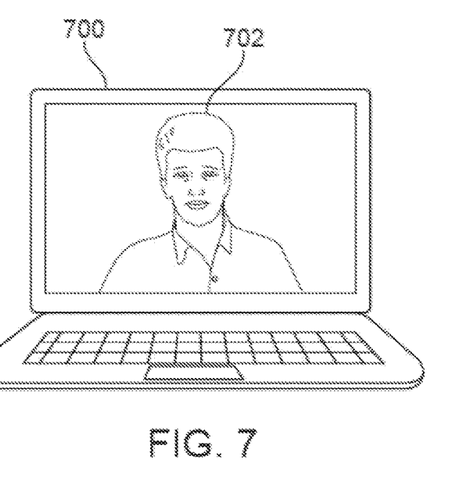

Treatment and processing of a candidate image of a head (120) are described with respect to FIG. 2 and FIG. 3. An example of the treatment and processing of a candidate image of a head is shown in FIG. 5 through FIG. 7.

The data repository (114) also stores an image of an object (121). The image of an object (121) is a set of pixels in an image taken by a camera that correspond to an object (e.g., the one or more objects (142) described below). The image of an object (121) may be one or more of the images of heads (118). The image of an object (121) may be the candidate image of a head (120). The image of an object (121) may correspond to an object that is not a head.

The data repository (114) also stores an apparent size (122). The apparent size (122) of a object (e.g., a head) is a measurement of the size of the candidate image of a head (120), as the candidate image of the head (120) appears in the image. Because the apparent size of an object becomes smaller as the physical distance between the camera and the corresponding object becomes greater, the apparent size (122) of an object is likely to be smaller than the true size of the object. However, for cameras equipped with a zooming lens, it is possible for the apparent size of the object to be greater than the true size of the object.

The true size of an object (e.g., a head) is the dimensions of the object (e.g., the head) when the physical dimensions of the object (e.g., the head) are directly measured (e.g., with a tape measure). The one or more embodiments can estimate the true size of an object (e.g., a head) whether the apparent size (122) is greater than or less than the true size of the object (e.g., a head).

The data repository (114) also stores an estimated true size (124) of an object (e.g., a head). The estimated true size (124) of an object is the result of a calculation based on inputs that include i) a distance between the camera (102) and the object and ii) and the apparent size (122) of the object measured using the candidate image of a head (120). The process of determining the estimated true size (124) of an object is described with respect to FIG. 2.

The data repository (114) also stores a threshold size range (126). The threshold size range (126) is a value (or values) comparable to the estimated true size (124) of the object. The threshold size range may have a lower boundary or an upper boundary.

The lower boundary defines a minimum for the estimated true size of the object in order for the candidate image of the head (120) to be considered to be a true image of a head. For example, the lower boundary may be set such that 97 percent of people will have a true head size that satisfies the lower boundary. The lower boundary may be differently set.

The upper boundary defines a maximum for the estimated true size of the object in order for the candidate image of the head (120) to be considered a true image of a head. For example, the upper boundary may be set such that 99 percent of people will have a true head size that satisfies the upper boundary. The upper boundary may be set differently.

In a more specific example, the lower boundary may be a number of inches. If the candidate image of the head (120) corresponds to an object having an estimated true size (124) that is less than the number of inches in a selected dimension, then the candidate image of the head (120) may be a misleading image of a head.

Similarly, the upper boundary may be another number of inches. If the candidate image of the head (120) corresponds to an object having an estimated true size (124) that is greater than the other predetermined number of inches in a selected dimension, then the candidate image of the head (120) again may be a misleading image of a head.

Otherwise, if the candidate image of the head (120) corresponds to an object having an estimated true size (124) within the threshold size range (126), then the candidate image of the head is a true head. Threshold values for the threshold size range (126) may vary. In some embodiments, the threshold size range (126) may be only one of the upper boundary and lower boundary.

The data repository (114) also stores a temperature (128), among possibly multiple temperatures, with there being at least one temperature per candidate image of a head (120). The temperature (128) is the temperature of the object corresponding to the candidate image of the head (120). Determination of the temperature (128) and use of the temperature (128) are described with respect to FIG. 2.

The data repository (114) also stores a threshold temperature range (130). The threshold temperature range (130) is a set of values that is comparable to the temperature (128). For example, the threshold temperature range (130) may be between about 95 degrees Fahrenheit and about 105 degrees Fahrenheit, but may have different values threshold ranges. A temperature (128) is defined as being outside the threshold temperature range (130) if the temperature (128) is below the lower boundary of the range or above the upper boundary of the range. Setting of the threshold temperature range (130) and use of the threshold temperature range (130) are described with respect to FIG. 2.

The data repository (114) also stores a modified head detection (132). The modified head detection (132) is the set of images of heads (118), but where misleading images of heads have been removed from the images of heads (118). In other words, the modified head detection (132) is a subset of the images of heads (118) in which the images of heads in the subset have been evaluated as corresponding to true images of heads.

Figure 4:
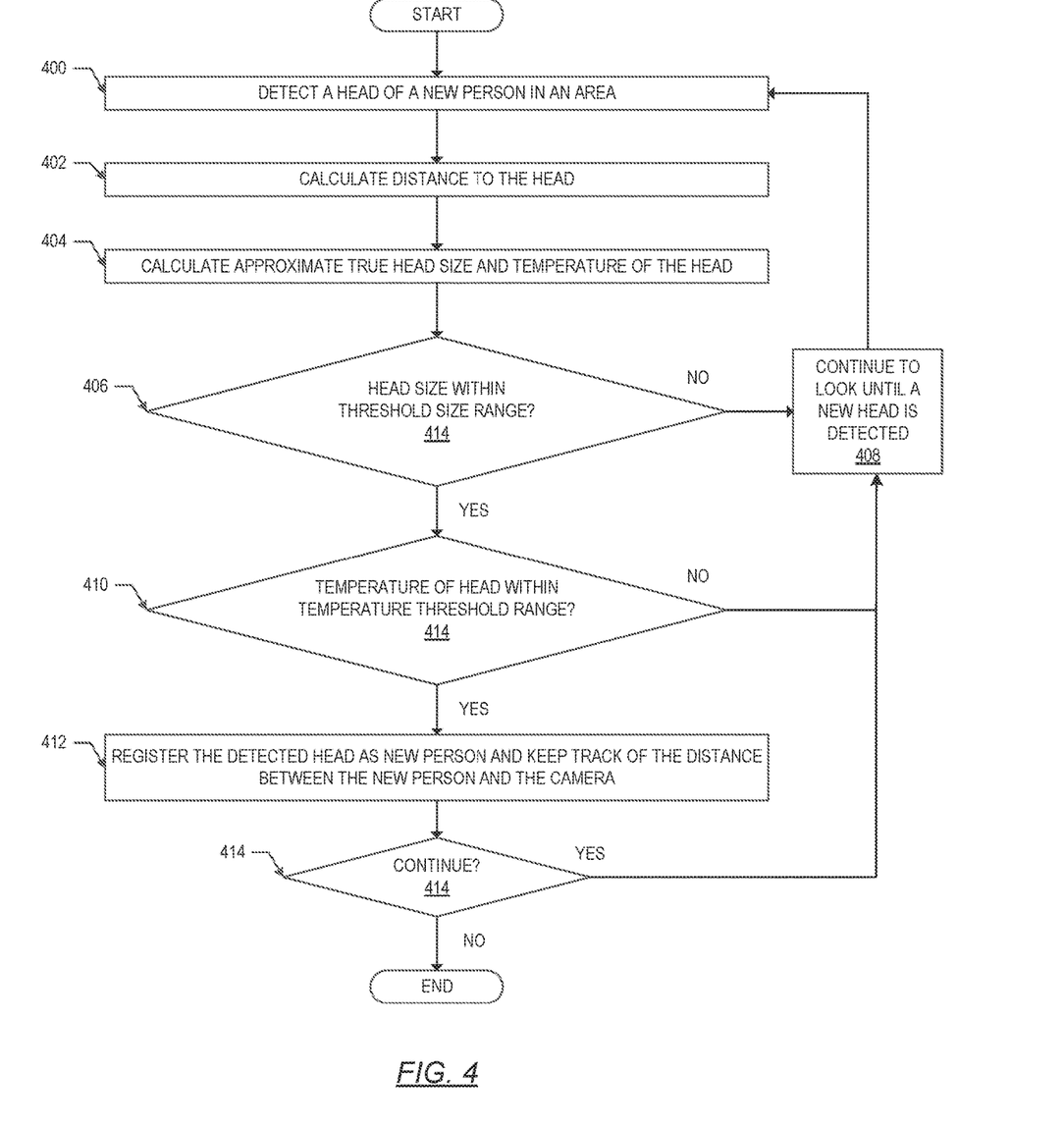

In an embodiment, the modified head detection (132) may be all detected images of heads (i.e., all of the images of heads (118)) in the case that all of the images of heads (118) are determined to be true images of heads after one or more of the methods of FIG. 2 through FIG. 4 have been applied. Similarly, in another embodiment, the modified head detection (132) may be zero images of heads (i.e., none of the images of heads (118)) in the case that none of the images of heads (188) are determined to be true images of heads after one or more of the methods of FIG. 2 through FIG. 4 have been applied.

As indicated above, the conferencing device (100) also includes the processor (104). The processor (104) is one or more computer processors or application-specific integrated circuits. While the example of FIG. 1 shows that the processor (104) is part of the conferencing device (100), the processor (104) may be separate from the conferencing device (100). For example, the processor (104) may be part of the camera (102). In another example, the processor (104) executes the code embodying the methods shown in FIG. 2 and FIG. 3 may be an off-site server, rather than the onboard processor or video card of the conferencing device (100).

The conferencing device (100) also includes a video controller (106). The video controller (106) is hardware (e.g., a video card, the processor (104), etc.) or software (e.g., computer-readable program code) programmed to perform the methods shown in FIG. 2 through FIG. 4 or the example of FIG. 5 through FIG. 7.

The conferencing device (100) also includes a machine learning model (108). The machine learning model (108) is computer program code or application-specific hardware that, when executed by the processor (104), classifies sub-images within the image(s) captured by the camera (102). In particular, the machine learning model (108) may classify one or more of the sub-images as being the images of heads (118). The machine learning model (108) may be one of several different models. Example models include convolutional neural networks, such as region-based convolutional neural networks, and you-only-look-once (YOLO) models.

The conferencing device (100) may also include a spectral controller (110). The spectral controller (110) is computer program code or application-specific hardware which, when executed by the processor (104), analyzes the light that falls on the detector in the camera (102). More particularly, the spectral controller (110) analyzes the infrared light. The spectral controller (110) is configured to estimate, based on the infrared light, the temperature (128) of an object that corresponds to a candidate image of a head (120). The details of the estimation are described with respect to FIG. 2.

The conferencing device (100) may transmit a processed video stream to a remote display device (112). The remote display device (112) is a display screen at a remote conference endpoint. The remote display device (112) is capable of showing images or the video stream (116) captured by the camera (102), or a modified version of the video stream generated at a device at the initiation endpoint of the video conference (e.g., the camera (102) located in the conference room (138), mentioned below).

While the remote display device (112) is shown as being part of the system shown in FIG. 1, the remote display device (112) may be an external display device in wired or wireless communication with the conferencing device (100), such as over a network. The remote display device (112) may display the output of the image processing described with respect to FIG. 2 and FIG. 3.

The system shown in FIG. 1 may include other components. For example, an actuator (136) may be connected to the camera (102), or the conferencing device (100). The actuator (136) may be a motor, gear system, etc. configured to alter the orientation, position, or zoom of the camera (102). Thus, the actuation of the actuator (136) causes the camera (102) to either move or to change the focal length (amount of zoom) of the camera (102). The video controller (106) may be configured to command the actuator (136) to move some part of the camera (102) in response to the modified head detection (132) (e.g., to turn the camera to more directly face the heads of the persons, or to focus more closely on such persons).

The camera (102) or conferencing device (100) interact with an environment, also shown in FIG. 1. The environment may include a conference room (138). One or more real persons may be present in the conference room (138). The one or more real persons have heads (140).

One or more objects (142) may be present in the conference room (138). The one or more objects (142) are not real persons. Nevertheless, it is possible that some of the one or more objects (142) may cause the machine learning model (108) to incorrectly identify portions of images of the one or more objects (142) as being misleading images of heads. The one or more objects (142) may be, for example, reflections of people on reflective walls, windows, reflective tabletops or other images, images of people shown on monitors or television sets in the field of view of the camera, pictures of people hanging on the walls of the conference room, dolls, mannequins, posters showing people, pieces of artwork that include head-like shapes, etc.

As described more fully with respect to FIG. 5 through FIG. 6, the presence of the one or more objects (142) may cause the video controller (106) to frame misleading images of heads. Thus, for example, as shown in FIG. 6, the video controller (106) incorrectly may show pictures in the background as being participants in the video conference. As one purpose of the video controller (106) may be to frame the images of heads, the presence of the misleading images of heads due to the one or more objects (142) may be deemed undesirable.

Light (144) from the conference room (138) may fall on the camera (102). As indicated above, light exists in a broad spectrum of wavelengths, only a few of which are visible to a person's eyes. Thus, while not visible to a person, the light (144) includes at least an infrared spectrum (146) in addition to a visible spectrum (148). The infrared spectrum (146) is light within the infrared wavelength range (defined above) and the visible spectrum (148) is light within the visible light wavelength range (defined above). While both spectrums fall on the camera (102), the camera (102) may include two different detectors, as described above, the infrared detector (102I) for detecting the infrared spectrum (146) and the optical detector (102P) for detecting the visible spectrum (148). In some embodiments, the same physical detector may detect both the infrared wavelength range and the visible wavelength range.

The distance (150) shown in FIG. 1 is the physical distance between the camera (102) and the heads (140) or the one or more objects (142) that correspond to misleading images of heads. The distance (150) may be determined using the light (144), as described with respect to FIG. 2, step 204, which relates to using the distance (150) to determine the estimated true size of a head. The distance (150) may be determined for each individual object in the conference room (138), but in particular is determined for each object corresponding to a candidate image of a head (120).

While FIG. 1 shows a configuration of components, other configurations may be used without departing from the scope of the one or more embodiments. For example, various components may be combined to create a single component. As another example, the functionality performed by a single component may be performed by two or more components.

FIG. 2 through FIG. 4 are flowcharts, in accordance with one or more embodiments. FIG. 2 is a method of filtering misleading images of heads from images of heads. FIG. 3 is a method of modifying a video stream using a modified head detection. FIG. 4 is a method of tracking images of heads. FIG. 2 through FIG. 4 may be performed using the system shown in FIG. 1.

Attention is first turned to FIG. 2. Step 200 includes receiving, at a camera, light including a visible spectrum and an infrared spectrum. The light is generated by a light source, such as one or more light bulbs in a conference room, or sunlight through a window. The light is received at one or more detectors. The visible spectrum of the light is received at an optical detector of the camera. The infrared spectrum is received at the infrared detector of the camera.

Step 202 includes detecting, using the visible spectrum, a candidate image of a head. Detection of the candidate image of a head may be performed using a machine learning model which takes, as input, the image generated by the camera and generates, as output, a probability that a sub-image within the image corresponds to a head. Sub-images within the image are not detected as candidate images of heads unless the probability meets (i.e., exceeds or is equal to or exceeds) a detection threshold. Sub-images that meet the detection threshold are classified as candidate images of heads.

Step 204 includes determining, from the candidate image of a head, an estimated true size of an object corresponding to the candidate image of the head. Estimating the true size of the object may be performed as follows. Briefly, two quantities are measured and then used to estimate the true size of the object corresponding to the candidate image of a head.

One of the quantities is the distance between the camera and the object. Determination of the distance between the camera and the object may be performed by several different methods.

One such method is a time of flight technique. The time of flight technique transmits light from a light source (on the camera, for example). The light may be infrared light from an infrared light source, and thus invisible to the human eye, or may be visible light (or other light wavelengths). When the projected light reaches the object, the light scatters. Some of the projected light is scattered back at the camera and may be detected.

A time difference is measured between a first time when the light was projected and a second time when the light is received at the detector. Because the speed of light in the atmosphere is a known constant (about 300 million meters per second), and the time is measured, the distance between the object and the camera may be estimated. For example, the measured time may be halved (since the projected light leaves the camera, reaches the target, and then must move back to the detector), and the result is multiplied by the speed of light. The final result is the estimated distance between the object and the light source/detector combination. While the time measured will be very short compared to common experience (roughly several nanoseconds, or billionths of a second), such short time measurements are within the operational capabilities of current electronic equipment. For example, a microcontroller, programmable gate array, or other electronics may be used to measure the time between the transmission of the reference light signal and the received scattered light signal.

The apparent size of the candidate image of the head may be measured by measuring the size of the candidate image of the head relative to other images of objects shown in the room. For example, determining the apparent size of the candidate image of a head may be performed by counting the number of pixels that the candidate image of the head occupies within the overall image captured by the camera. A reference object of known size in the room may occupy a predetermined number of pixels. A first number of pixels of the candidate image of the head may be scaled to a second number of pixels of the reference object to estimate the apparent size of the candidate image of the head. In another alternative, the number of pixels of the candidate image of the head may be compared to the number of pixels that an average-sized head should occupy at the measured distance. The apparent size of the candidate image of the head may then be determined in reference to the number of pixels expected for a real head at that distance.

In another example, the apparent size of the candidate image of the head may be measured in relation to a coordinate system imposed on the camera image. For example, the camera image may have imposed a grid. Points on the grid may be counted in order to assess the apparent size of the candidate object, relative to the images of other objects in the camera image.

Once both the distance to the object (corresponding to the candidate image of a head) and the apparent size of the candidate image of the head are known, the estimated true size of the object may be determined using the focal length of the camera. For example, the estimated true size of the object may be determined by multiplying the apparent size of the candidate image of the head by the distance to the object, and then dividing the result by the focal length of the camera. Thus, the estimated true size of the object may be estimated from the measured apparent size of the candidate image of the head in conjunction with the measured distance between the camera and the object corresponding to the candidate image of the head. Note that because the focal length is used to determine the estimated true size of the object, the one or more embodiments can accurately estimate the true size of the object regardless of whether the apparent size of the object is greater than or less than the true size of the object.

Other techniques, may be used by estimating the angular size of a candidate image of a head, as perceived by the camera. For example, the number of pixels the candidate image of the head occupies along a dimension of the corresponding object may be compared to the total number of pixels of the camera image along that dimension. The result is the apparent angular size of the candidate image of the head. The distance to the object is measured, as described above. Then, the estimated true size of the object is the measured angular size multiplied by 2 times the number Pi (about 3.14) times the distance to the object, with the overall result divided by 360.

Step 206 includes determining, using the infrared spectrum, a temperature of the object corresponding to the candidate image of the head. The temperature of the object may be determined using a number of techniques, such as directly measuring the temperature of the object using a thermometer. However, in many instances, it may be more convenient to measure the temperature of the object using the infrared spectrum of the light falling on the camera.

The temperature of any object may be determined by measuring the wavelengths of light being emitted from the object and using Wein's law to estimate the temperature of the object. In other words, by measuring the infrared spectrum wavelengths emitted by an object, it is possible to determine the temperature of the object using Wein's law.

All objects that have a measurable temperature, including persons, radiate electromagnetic energy (i.e., light) due to a spontaneous process of radiative distribution of entropy. Stated differently, all objects emit light due to the objects' conversion of internal energy into electromagnetic energy (i.e., light). Persons, who on average have a body temperature of about 98 degrees Fahrenheit, radiate infrared light at wavelengths of about 9.5 micrometers (as does any object at a similar temperature). Similarly, objects at room temperature (e.g., 72 degrees Fahrenheit) will radiate infrared energy at slightly lower wavelengths of infrared light than objects at body temperature (e.g., 98 degrees Fahrenheit).

By measuring the wavelengths of the infrared spectrum emitted by an object corresponding to a candidate image of a head, it is possible to determine whether the object has a temperature that is within a defined temperature threshold range. Those objects that have temperatures that are within the defined temperature threshold range are more likely to be heads, and thus the candidate image of the head is more likely to be a true image of a head. Those objects that have temperatures that are outside the defined temperature threshold range are more likely to be objects other than heads, and thus the candidate image of the head is more likely to be a misleading image of a head.

In summary, determining the temperature of the object using the infrared spectrum may be performed as follows. First, a portion of the infrared spectrum corresponding to the object is isolated. Then, an average frequency of infrared radiation in the portion of the infrared spectrum is determined. Finally, using Wein's law, the temperature of the object may be estimated using the average frequency of infrared radiation radiating from the object corresponding to the candidate image of a head.

The candidate image of a head in the visible spectrum camera may be correlated to the candidate image of a head in the infrared spectrum camera in order to determine that that the same candidate image of a head is considered with respect to the visible image and the infrared image. Stated differently, it is useful to confirm that the candidate image of the head, as detected by the visible spectrum camera, is the same candidate image of the head as that detected by the infrared spectrum camera.

The two images of the candidate image of the head may be correlated using a number of different techniques. For example, a pre-determined correlation may be established between the pixels of the visible camera and the pixels of the infrared camera. In other words, the pre-determined correlation may be used to determine that a first set pixels in the visible spectrum camera may be correlated to a second set of pixels in the infrared spectrum camera. Thus, when a candidate image of the head is detected in the visible spectrum camera, first pixels of the visible spectrum camera that form the candidate image of the head may be correlated to second pixels in the infrared spectrum camera.

Another technique, which may be combined with the above correlation technique, may be used to correlate the two images. If the second pixels in the infrared spectrum camera have a second shape that satisfies a pre-determined shape similarity relative to a first shape of the first pixels formed by the candidate image of the head in the visible spectrum camera, then it may be confirmed that the two cameras are detecting the same candidate image of the head.

Another technique to correlate the candidate images of the head taken by the two cameras is to use the distance to the object corresponding to the candidate image of the head, as determined above with respect to step 204, but using both the infrared light and the visible light. If the difference in the distances to the objects, as measured by both the visible spectrum camera and the infrared spectrum camera, are within a pre-determined range of distances, then it may be confirmed that the two cameras are detecting the same candidate image of the head. For example, if a first distance to the object, as measured by the visible spectrum camera, is about the same as a second distance to the object, as measured by the infrared spectrum camera, then it is determined that the two cameras are detecting the same candidate image of a head. Other image correlation techniques may be possible.

Step 208 includes filtering the candidate image of the head with respect to an operation of an video controller configured to track one or more images of head detectable in the visible spectrum. Filtering may be based on both the estimated true size of the object corresponding to the candidate image of the head and the temperature of the object corresponding to the candidate image of the head. The candidate image of the head may be filtered before further processing of the remaining images of heads (e.g., the video controller processes only those images of heads that correspond to true images of heads). Thus, filtering may include removing, with respect to the tracking of the one or more images of heads, one or more of the candidate image of the head from the images of heads. Specifically, misleading images of heads are removed from the total set of images of heads.

Alternatively, the candidate image of the head may be filtered after processing the remaining images of heads (e.g., after the video controller processes all candidate images heads). The misleading images of heads may still be tracked for other purposes, or for improving the recognition of heads by the machine learning model.

As indicated above, removing the candidate image of the head may be performed responsive to both i) the estimated true size of the object corresponding to the candidate image of the head being less than a threshold size range, and ii) the temperature of the object being outside a threshold temperature. However, removing the candidate image of the head may also be performed in response to satisfaction of either of the two conditions alone. Nevertheless, it may be useful to require both the estimated true size and the temperature as conditions for removing a candidate image of a head in order to decrease the probability of a false negative detection (i.e., the machine learning algorithm failing to classify a candidate image of a head as a head when the candidate image of a head does actually correspond to a head).

The video controller may track one or more images of heads. For example, the video controller may recognize that the image of a head is moving within the video stream and maintain focus on the moving head. Thus, for example, a person walking in the conference room will be tracked so that the different positions of the person in the series of images that form the video are not treated as different heads by the head detection algorithm. The video controller may also track misleading images of heads in some embodiments.

In either case, a video stream may be modified based on filtering the candidate image of a head and tracking the one or more images of heads. For example, a video stream taken by the camera using the visible spectrum may be modified to show only the real heads on a display screen.

Modification may include framing, in the video stream, a selected head in the images of heads. The candidate image of the head filtered by the video controller (i.e., a misleading image of a head) may be excluded from being the selected head. The video controller then may frame the image of the object that corresponds to the selected head, or perform some other modification to the video stream.

The selected head is chosen based on a criteria. The criteria may include an image of a head of a presenter and an image of a head of a speaker (as determined by a microphone). However, other heads may be selected, such as by identification of a person via facial recognition, by pre-determined allocation, and others.

Modification may also include selecting a sub-group of images of heads from among the one or more images of heads. The sub-group of images of head excludes the candidate image of the head filtered with respect to the video controller (i.e., excludes the misleading images of heads). Modification in this instance also includes presenting the images of heads in the video stream that correspond to the sub-group of images of heads. An example is shown in FIG. 7.

Modification may also include zooming, in the video stream, on a selected head in the one or more images of heads. The selected head excludes the candidate image of the head filtered with respect to the video controller. Thus, the video presented on the display screen may show a close-up view of the images of heads of the people in a conference room.

Modification may also include modifying, based on filtering of the candidate image of the head, derived information generated from the tracking of the one or more images of heads. For example, the derived information may include a number of attendees detected by the tracking, a number of speakers detected by the tracking, and an identity of an attendee detected by the tracking. In a more specific example, if the algorithm identifies ten images of heads, but three of the images of heads are identified as corresponding to misleading images of the heads, then the number of attendees (derived information) that are automatically recorded as being present may be reduced from ten to seven.

Attention is now turned to FIG. 3. FIG. 3 is a method of modifying a video stream using a modified head detection. FIG. 3 is an alternative to the method described with respect to FIG. 2. The method of FIG. 3 may be performed using the system shown in FIG. 1.

Step 300 includes receiving, at a camera, light including a visible spectrum and an infrared spectrum. The light may be received as described with respect to step 200 of FIG. 2.

Step 302 includes generating, using the light, a video stream. The video stream may be generated by the camera, or by a computer connected to the camera. In either case, the light is converted into electrical signals, which a computer may use to generate a series of images that forms the video stream.

Step 304 includes detecting, using the visible spectrum, a candidate image of a head in the video stream. Detecting the candidate image of the head may be performed as described with respect to step 202 of FIG. 2. The candidate image of the head is the currently selected image of a head which is being determined, automatically, to be either a true image of the head or a misleading image of the head.

Step 306 includes detecting, using the visible spectrum, images of heads in the video stream, the images of heads including the candidate image of the head. Generation of the images of heads may be performed as described with respect to step 202 of FIG. 2. Step 306 may be performed before, after, or concurrently with step 302.

Step 308 includes determining, from the candidate image of the head, an estimated true size of the object corresponding to the candidate image of the head. Step 308 may be performed as described with respect to step 204 of FIG. 2.

Step 310 includes determining, using the infrared spectrum, a temperature of the object corresponding to the candidate image of the head. Step 310 may be performed as described with respect to step 206 of FIG. 2.

Step 312 includes generating a modified head detection by removing, from the images of heads, the candidate image of the head. Removing is performed responsive to both i) the estimated true size of the object being outside a threshold size range, and ii) the temperature of the object being outside a threshold temperature. Removing the candidate image of the head may be performed before or after processing the other images of heads. Again, the modified head detection is the plurality of images of heads, but not including the removed candidate image of the head.

Step 314 includes modifying the video stream using the modified head detection. Modifying the video stream may be performed as described with respect to step 208 of FIG. 2.

FIG. 4 is a method of tracking images of heads in a video stream. The method of FIG. 4 is an alternative to the methods of FIG. 2 and FIG. 3. The method of FIG. 4 may be performed using the system shown in FIG. 1.

Step 400 includes detecting a head of a new person in an area. The head may be detected using a camera, as described above with respect to FIG. 2 and FIG. 3.

Step 402 includes calculating a distance to the head. Calculating the distance to the head may be performed, as described above with respect to FIG. 2 and FIG. 3.

Step 404 includes calculating an approximate true head size and the temperature of the head. The approximate true head size may be determined using the distance (from step 402) and a pixel count. The pixel count is the number of pixels in the portion of the image or video that forms the candidate image of a head. Calculating the temperature of the head may be performed as described with respect to FIG. 2 and FIG. 3.

Step 406 includes determining whether the head size is within a threshold size range, as described above with respect to FIG. 2 and FIG. 3. If not, then the method proceeds to step 408, which includes continuing to look until a new head is detected. If so (i.e., the head size is within the threshold), then the method proceeds to step 410.

Step 410 includes determining whether the temperature of the head is within a temperature threshold range, as described above with respect to FIG. 2 and FIG. 3. If not, then the method returns to step 408. If so (i.e., the temperature of the head is within the temperature threshold range), then the method proceeds to step 412.

Step 412 includes registering the detected head as a new person and keeping track of the distance between the new person and the camera. Registering the detected head may be performed by setting a flag that the head being tracked belongs to a real person, and thus the corresponding image of the head should be subjected to further processing when generating a video stream that includes the image of the head. Generating or modifying the video stream may be performed as described with respect to FIG. 2 or FIG. 3.

Step 414 includes determining whether to continue the process. If so, then the method returns to step 408 and continues. Otherwise, the method of FIG. 4 may terminate thereafter.

While the various steps in the flowcharts are presented and described sequentially, at least some of the steps may be executed in different orders, may be combined or omitted, and at least some of the steps may be executed in parallel. Furthermore, the steps may be performed actively or passively.

FIG. 5 through FIG. 7 present a specific example of the techniques described above with respect to FIG. 1 through FIG. 3. The following example is for explanatory purposes only and is not intended to limit the scope of the one or more embodiments.

FIG. 5 shows an image (500) of a conference room, which is an initiation point for a video conference. The image (500) is taken by a camera (not shown) that includes both an optical detector (i.e., configured to detect visible light) and an infrared detector (i.e., configured to detect infrared light). The image (500) shown is taken by the optical detector.

The camera, or other equipment in the conference room, may include the programming or hardware to perform the methods of FIG. 2 through FIG. 4. However, an intermediate server between the initiation point for the video conference and the destination point for the video conference may also include the programming to perform the methods of FIG. 2 through FIG. 4.

The conference room includes a single real person seated in a chair. Thus, the image (500) shows a true image of a head (502) of the real person.

However, the conference room also includes two posters which show pictures of people. The people shown in the pictures are not actually present in the conference room. Thus, the image (500) shows the images of two misleading heads, including misleading image of a head (504) and misleading image of a head (506).

FIG. 6 shows an example of a modified video stream (600) transmitted to a destination device. A machine learning algorithm detected the heads in the image (500), including the true image of a head (502), the misleading image of a head (504), and the misleading image of a head (506) of FIG. 5. A video controller is configured to convert the image (500) into a modified video stream.

In the example of FIG. 6, the video controller is programmed to split the view screen into multiple segments and to display different information in each segment. One of the segments, segment (602) shows conference information (date, time, recording status, a word processing presentation, etc.) The other three segments frame the images of heads detected in the image (500) (i.e., the true image of a head (502), the misleading image of a head (504), and the misleading image of a head (506) of FIG. 5).

Users may become dissatisfied with the modified video stream (600) because a real user will be able to assess instantly that the misleading images of heads are pictures, and not real people participating in the video conference. The user dissatisfaction may cause the users to stop using the conferencing software product, which may be an undesirable result.

However, the one or more embodiments remove or filter the misleading images heads (i.e., misleading image of a head (504) and the misleading image of a head (506) of FIG. 5). The removal or filtering is performed according to the methods described with respect to one or more of the methods of FIG. 2 through FIG. 4. FIG. 7 shows the result of the modified video stream after filtering according to the one or more embodiments.

The video stream (700) shown in FIG. 7 only shows the image of a single participant; namely, the true image of the head (702) of the real person (i.e., the true image of a head (502) in FIG. 5). The misleading image of a head (504) and the misleading image of a head (506) of FIG. 5 have been filtered, as described above, and thus are not used in the generation of the video stream (700).

The one or more embodiments shown in FIG. 5 through FIG. 7 may be varied. For example, optionally, the video stream (700) may be split into two segments (not necessarily of the same size), with the conferencing information (602) shown in FIG. 6 displayed in one of the segments and the true image of the head (702) of the real person shown in the other segment.

The embodiments shown in FIG. 5 through FIG. 7 are presented only to provide greater clarity by way of example. Thus, the embodiments shown in FIG. 5 through FIG. 7 do not necessarily limit the other embodiments described herein.

As used herein, the terms "connected to" or "in communication with" contemplate multiple meanings. A connection or communication may be direct or indirect. For example, computer A may be directly connected to, or communicate with, computer B by means of a direct communication link. Computer A may be indirectly connected to, or communicate with, computer B by means of a common network environment to which both computers are connected. A connection or communication may be wired or wireless. A connection or communication may be a temporary, permanent, or semi-permanent communication channel between two entities.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, the term "or" is an "inclusive or" and, as such includes the term "and." Further, items joined by the term "or" may include any combination of the items with any number of each item, unless expressly stated otherwise.

In the above description, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. Further, other embodiments not explicitly described above can be devised which do not depart from the scope of the invention as disclosed herein. Accordingly, the scope of the invention should be limited only by the attached claims.

What is claimed is:

1. A method of modifying a video stream, comprising:
receiving, at a camera, light comprising a visible spectrum and an infrared spectrum (300);
generating, using the light, a video stream (302);
detecting, using the visible spectrum, a candidate image of a head in the video stream (304);
detecting, using the visible spectrum, a plurality of images of heads in the video stream, the plurality of images of heads including the candidate image of the head (306);
determining, from the candidate image of the head, an estimated true size of an object corresponding to the candidate image of the head (308);
determining, using the infrared spectrum, a temperature of the object (310);
generating a modified head detection by removing, from the plurality of images of heads, the candidate image of the head, wherein removing is performed responsive to both i) the estimated true size of the object being less than a threshold size range, and ii) the temperature of the object being outside a threshold temperature range (312); and
modifying the video stream using the modified head detection (314).

2. The method of claim 1, wherein modifying the video stream comprises:
framing, in the video stream, on a selected head in the modified head detection (314).

3. The method of claim 2, wherein the selected head is chosen based on a criteria selected from the group consisting of: an image of a head of a presenter and an image of a head of a speaker (314).

4. The method of claim 1, wherein modifying the video stream comprises:
selecting a sub-group of images of heads in the modified head detection (312); and
presenting the sub-group of images of heads in the video stream (314).

5. The method of claim 1, wherein modifying comprises:
zooming, in the video stream, on a selected image of a head in the modified head detection (314).

6. A system comprising:
an optical camera (102 P) configured to:
receive a visible spectrum (148) of light, and
generate a video stream (116) from the visible spectrum (148);
an infrared camera (102I) configured to receive an infrared spectrum (146) of light;
a machine learning model (108) configured to detect a plurality of images of heads (118) in the video stream (116), the plurality of images of heads (118) including a candidate image of a head (120);
a spectral controller (110) configured to estimate, using the infrared spectrum (146), a temperature (128) of an object corresponding to the candidate image of the head; and
a video controller (106) in communication with the optical camera (102 P), the infrared camera (102I the machine learning model (108), and the spectral controller (110), wherein the video controller (106) is configured to:
select the candidate image of the head (120) from among the plurality of images of heads (118) in the video stream (116);
determine an estimated true size (124) of the object corresponding to the candidate image of the head;
generate a modified head detection (132) by removing, from the plurality of images of heads (118), the candidate image of the head (120), wherein removing is performed responsive to both i) the estimated true size (124) of the object being less than a threshold size (126) range, and ii) the temperature (128) of the object being outside a threshold temperature range (130); and
modify the video stream (116) using the modified head detection (132).

7. The system of claim 6, further comprising:
an actuator (136) connected to the optical camera (102 P), wherein the video controller (106) is further configured to command the actuator (136) to adjust an orientation of the optical camera (102 P) responsive to the modified head detection (132).

* * * * *